United States Patent [19]  [11] 3,928,069
Sperandio et al.  [45] Dec. 23, 1975

[54] METHOD FOR CUTTING OUT SUBSTANTIALLY RECTANGULAR ELECTRODES FROM A CONTINUOUS BAND OBTAINED BY SAID METHOD AND CELLS EMBODYING SAID ELECTRODES

[75] Inventors: Francis Sperandio, Le Bouscat; Michel Leturque, Lormont, both of France

[73] Assignee: Saft-Societe des Accumulateurs Fixes et de Traction, Romainville, France

[22] Filed: Sept. 5, 1974

[21] Appl. No.: 503,252

[30] Foreign Application Priority Data
July 12, 1974 France .............................. 74.24356

[52] U.S. Cl................... 136/75; 136/29; 136/120 R
[51] Int. Cl........................................... H01m 35/18
[58] Field of Search ....... 136/29, 75, 27, 31, 33–35, 136/66, 67, 120 R, 111, 24

[56] References Cited
UNITED STATES PATENTS
3,004,094  10/1961  Haessly ........................... 136/111 X
3,377,202  4/1968  Belove ................................. 136/29
3,540,931  11/1970  Loukomsky .......................... 136/29
3,784,410  1/1974  Bergum et al. ................. 136/111 X
3,799,808  3/1974  Hancock ............................. 136/29

*Primary Examiner*—John H. Mack
*Assistant Examiner*—C. F. LeFevour
*Attorney, Agent, or Firm*—Kenyon & Kenyon Reilly Carr & Chapin

[57] ABSTRACT

The invention concerns a method for cutting out substantially rectangular electrodes from a continuous band comprising at least one zone that is not coated with active material parallel to its edges. Such a method is characterized more particularly in that the edges of the electrodes are cut out obliquely in relation to the axis of the band. The application of this method is particularly to the manufacture of electrodes for alkaline electrolyte electrochemical cells. Cells embodying electrodes manufactured by this method are also described.

8 Claims, 4 Drawing Figures

METHOD FOR CUTTING OUT SUBSTANTIALLY RECTANGULAR ELECTRODES FROM A CONTINUOUS BAND OBTAINED BY SAID METHOD AND CELLS EMBODYING SAID ELECTRODES

RELATED APPLICATIONS

A related application entitled "Self-Tightening Sealing Arrangement For An Enclosure Such As a Casing For An Electrochemical Cell" Ser. No. 503,260 filed Sept. 5, 1974 is co-pending.

BRIEF SUMMARY OF INVENTION

The invention relates to a method for cutting out electrodes having a sintered support from a continuous strip, the electrodes obtained by that method and cells embodying such electrodes.

It is an already known method, disclosed in Salauze U.S. Pat. No. 2,619,962 to prepare strips of sintered nickel by a continuous method by sintering nickel on perforated bands, the strips being thereafter impregnated with active materials by any suitable method and then cut up into electrodes to be used in alkaline electrolyte electrochemical cells. As an alternative, the cutting up may be effected on the non-impregnated sintered band, impregnation with active materials being effected subsequently on the already cut out elements to complete the electrodes.

This patent provides for zones on the edge of the strips, or intermediate zones parallel to the edges that are not perforated and freed of active material as the wiping in order to have zones from which thee terminal lugs will be cut that are free of active material to facilitate attachment of electrical connections to such lugs.

An example of the cutting out of the terminal lugs is given in French Pat. No. 1,583,202 which may be seen a rectangular plate at least one of whose edges correspond to the edge of a perforated zone wiped free of active material and where the protruding terminal lug free of active material is cut out from said wiped zone.

It will be observed that in such a plate, if the space inside the cell reserved for the electrode is a rectangle, the portion of the plate bearing the active material can have only the surface area of a rectangle reduced in dimensions relative to the rectangular space by a rectangular uncoated strip having, at the best, a length equal to the small side of the rectangle and a width equal to the height of the terminal lug. In order to increase the area of the electrode portion bearing the active material to fit within the area defined by the rectangular cell space, it could be possible to fold back the lug over the main body of the electrode, but this would thus form an extra thickness in the area covered by the folded back lug and also a weakened zone at the fold of the plate.

The present invention is intended to overcome that disadvantage.

Among its objects and features is a method for cutting out substantially rectangular electrodes from a continuous strip comprising at least one zone not coated with active material disposed parallel to its edges, characterized in that the edges of the electrodes are cut out obliquely in relation to the longitudinal axis of the strip, with triangular corner portions only cut out in the zones free of active material.

According to a preferred embodiment, the direction of the cut is at 45° to the longitudinal axis of the strip.

In this way, it is possible to cutout from the strip rectangles or squares one only of whose angular corners comprises a wiped or uncoated area, that angular corner free of active material subsequently being used as a lug for the connection of such electrodes to the corresponding output terminal of a cell.

The invention will be better understood from the following description of an example having no limiting character in relation with the accompanying drawings in which.

DETAILED DESCRIPTION

Figure 1:
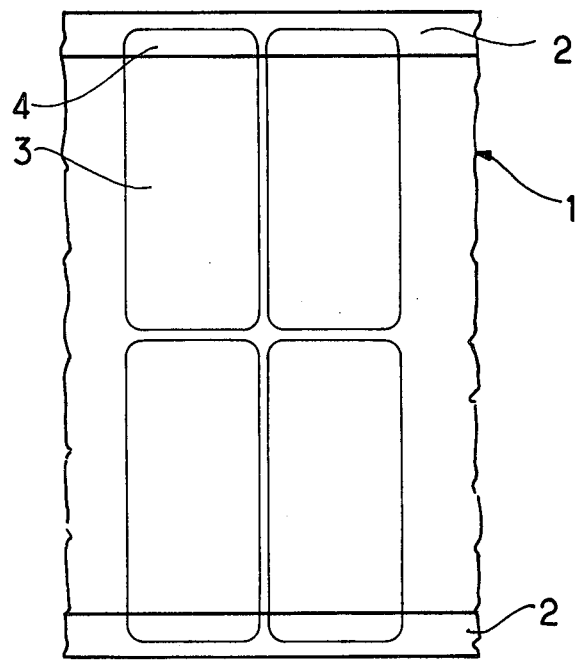
FIG. 1 is a view of a strip from which four electrodes according to the usual prior art technique are cut out.

In FIG. 1, the metal strip 1 prepared, for example, according to the process of said U.S. Pat. No. 2,819,962 comprises, on each side, a wiped or active material free edge 2. Four electrodes 3 separated from that strip by cutting transversely at right angles to its longitudinal axis according to the usual prior art method, with plate lugs 4 which are located in the wiped active material free edge 2, are shown.

It is possible to calculate, for example, the ratio between the total surface and the available active material impregnated surface of one electrode 3 assuming that each electrode has a total area of 25 × 60 mm; the height of its terminal lug 4 being 5 mm. Then the ratio between the active material impregnated surface and the total surface is:

$$\frac{25 \times 60 - 25 \times 5}{25 \times 60} \times 100 = 91.87\%$$

Figure 2:
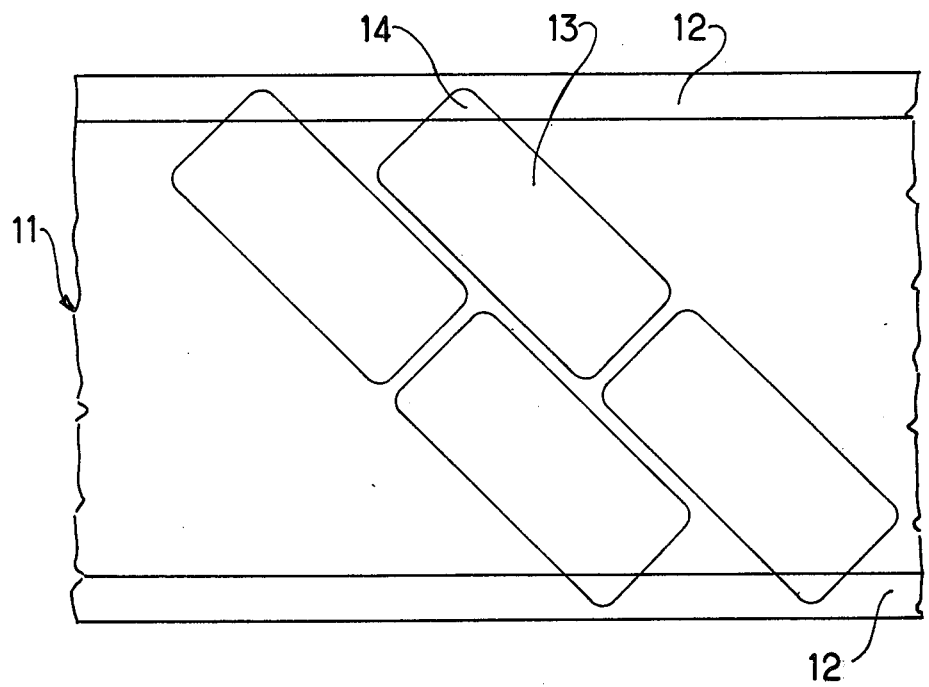
FIG. 2 is a view of a similar strip from which four electrodes having the same dimension as the previous ones, but cut out according to the invention are cut out.

On the other hand, if the electrodes 13 of the same dimensions are cut out on a bias to the longitudinal axis in the manner shown in FIG. 2, which shows a strip 11 having two edges 12 wiped free of active material from which strip are cut out, at an inclination of 45° to the longitudinal axis of strip 11, the four plates 13, the wiped portion 14 free of active material of each such plate 13 is an isosceles right-angled triangle 14. If we assume that the altitude or height of this triangle 14 is 5 mm and the dimensions of each electrode as to length and width are the same as those electrodes 3 cut in FIG. 1, then the area of the triangle 14 will be 25 sq.mm. Therefore, the ratio between the active area of the electrode 12 and the total surface area will be:

$$\frac{25 \times 60 - 25}{25 \times 60} \times 100 = 98.33\%$$

It may be seen, therefore, that 6.66 percent of active surface area are gained. However, in actual fact, the gain in electrode capacity will be even greater, for there is at the juncture of the wiped portion 12 and active material portion, due to that wiping, an active material border where the overall thickness is less than the overall thickness of the active material-bearing portion of the electrode in the middle of the strip and where, consequently, the capacity per unit of surface is less than the capacity per unit of surface in the middle of the strip. Now, in the electrodes 3 of the assumed dimensions cut out by the conventional method of FIG. 1, the length of that border is 25 mm whereas in the electrode 14 of the same dimensions cut out bby the bias method according to the invention, the length of the said border is now only 10 mm. It will be seen, therefore, that in actual fact, the gain in capacity of electrodes of the same dimensions prepared by the method of FIG. 2 will, therefore, be greater than 7. percent.

An alkaline storage cell comprising a sintered positive electrode 14 prepared according to the method of the invention is described hereinafter by way of illustration.

Figure 3:
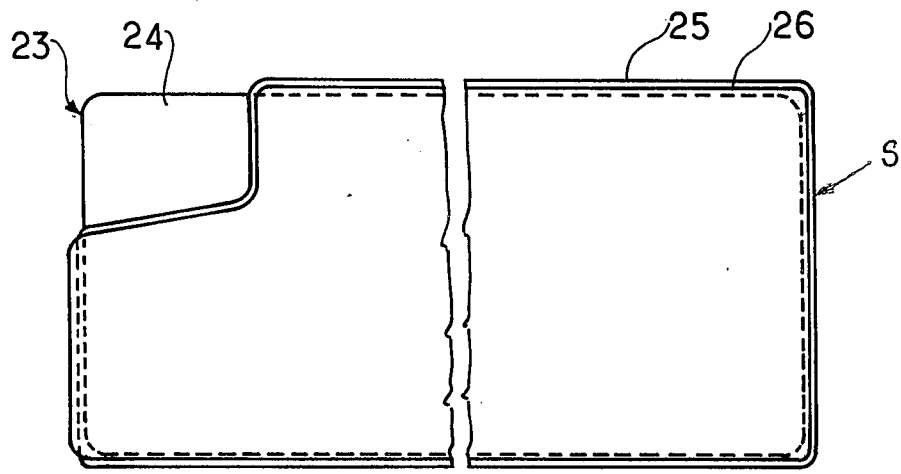
FIG. 3 shows a stack of electrodes one of which is obtained according to the invention.
Figure 4:
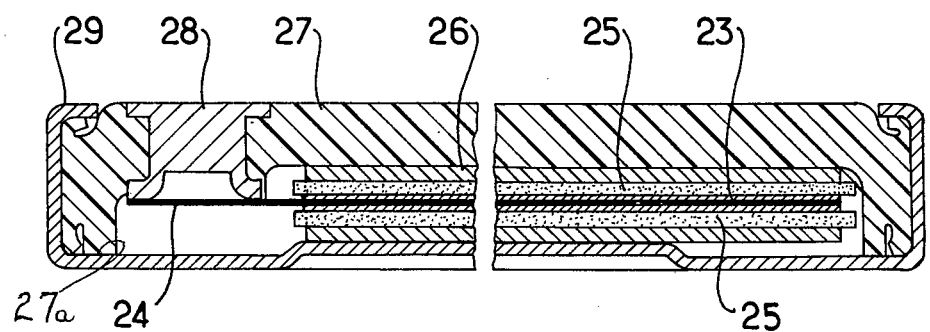
FIG. 4 is a sectional view of a storage cell comprising the stack of electrodes in FIG. 3.

Referring to FIG. 3, it shows a stack S of positive and negative electrodes of the storage cell, separators being inserted between them, seen from above, and FIG. 4 shows a sectional view of a storage cell comprising that stack.

As shown in FIG. 3, the positive electrode 23 with a sintered support, cut out according to the invention as shown in FIG. 2 is interposed between two negative electrodes 26 constituted by a strip folded substantially in U-shape around the said electrode 23.

A separator 25 also constituted by a U-shaped folded back strip of separator material is interposed between the electrodes 23 and 26 and extends slightly beyond the stack on at least three sides. It must be understood that the two negative electrodes could be independent of each other on condition that they be electrically connected in another way.

Likewise, the separator 25 could be formed by two separate parts. Recesses are formed in the strips of separator and negative electrodes so as to allow the wiped corner 24 of the positive electrode 23 to be exposed.

Once that stack S has been thus prepared, it is deposited in the lid 27 of the desired storage cell. This lid may be the same as the corresponding lid of said co-pending application and is of suitable insulative plastic material in the form of a cup which for assembly purposes is turned upside down, its rim 27a pointing upwards, for the stack to be placed in it. As seen in FIG. 4, said lid 27, made of plastic material has a terminal element such as a metallic rivet 28 arranged in one of its corners and in sealing relationship traversing its thickness. The active material free corner 24 of the positive electrode is positioned so that it rests on the inner base of that rivet 28 and is welded or soldered thereto by any suitable method. The electrolyte is added to the inverted cup-like lid 27 for imbibement in the separator 25. In the alternative the separator 25 may be pre-impregnated with suitable electrolyte. Then a metal cup 28 similar to the corresponding cup of said copending application which constitutes the complementary part of the storage cell casing is fitted onto the lid bearing the aforesaid assembly of components and the edges of the cup are crimped onto the bottom of the lid 27. The metal cup 29 then is in direct contact with the negative electrode 26 and thus acts as a negative output terminal of the cell, the positive terminal of which is constituted by the said rivet 28. A storage cell of small height in the vertical direction but in which the inner space is occupied to a maximum extent by the active materials of the electrodes is thus produced. SUch a cell contains thus a larger quantity of active materials than a cell with electrodes other wise of similar dimensions produced by the method of FIG. 1.

It must be understood that all the preceding figures are given only by way of an illustration and variations are possible and are contemplated within the scope of the claims. For example, the width of the strip 11 could, for example, be twice the width shown with a further wiped zone free of active material extending longitudinally in the middle so that double the number of electrode elements could be cut at a time. Other variants could be provided for the strip width and the bias cutting out thereof without departing from the spirit of the invention. There is no intention, therefore, of limitation to the exact details hereinabove presented.

What is claimed is:

1. Method for cutting out substantially rectangular electrodes from a continuous strip comprising at least one zone uncoated with active material parallel to its longitudinal edges, characterized in that the edges of the electrodes are cut out obliquely in relation to the longitudinal axis of the strip so that angular corners of said electrodes are cut out in the uncoated zone of said strip.

2. Method according to claim 1, characterized in that the edges form an angle of about 45° to the longitudinal axis of the strip.

3. Electrode produced by the method according to claim 1.

4. Method for cutting out substantially rectangular electrodes from a continuous strip comprising at least one zone uncoated with active material parallel to its longitudinal edges characterized in cutting electrodes with edges oblique in relation to the longitudinal axis of said strip, with adjoining edges of the cut electrode defining a corner lying in the uncoated zone of said strip, said adjoining edges each forming an angle of about 45° with respect to the longitudinal axis of said strip.

5. An electrode comprising a rectangularly shaped body coated with active material in all its area except a corner portion of triangular configuration that is bare of said active material.

6. An electrode according to claim 5 wherein said corner of triangular configuration is in the shape of an isosceles right triangle.

7. An electrochemical cell comprising a positive electrode, a negative electrode, and separator means between the electrodes forming a stack, electrolyte and a casing, said positive electrode comprising rectangularly shaped body with active material in all its area except a corner portion of triangular configuration bare of said active material.

8. An electrochemical cell according to claim 7 wherein said casing comprises a cup-like lid of plastic material and a metal cup interfitted with and secured to said lid, said lid having a conductive member electrically connected to said corner portion of said positive electrode and said metal cup being in direct contact with said negative electrode, said conductive member and said metal cup serving as terminals for said cell.

* * * * *